(12) United States Patent
Alkier et al.

(10) Patent No.: US 11,530,604 B2
(45) Date of Patent: Dec. 20, 2022

(54) SENSOR ON CLAMP DEVICE

(71) Applicant: McCoy Global Inc., Edmonton (CA)

(72) Inventors: Michael Albert Alkier, Liberty Hill, TX (US); Del Allen Prior, Austin, TX (US)

(73) Assignee: MCCOY GLOBAL INC., Edmonton (CA)

( * ) Notice: Subject to any disclaimer, the term of this patent is extended or adjusted under 35 U.S.C. 154(b) by 379 days.

(21) Appl. No.: 16/415,345

(22) Filed: May 17, 2019

(65) Prior Publication Data

US 2019/0353028 A1 Nov. 21, 2019

Related U.S. Application Data

(60) Provisional application No. 62/713,859, filed on Aug. 2, 2018, provisional application No. 62/673,236, filed on May 18, 2018.

(51) Int. Cl.
*E21B 47/017* (2012.01)
*E21B 47/01* (2012.01)
*E21B 47/13* (2012.01)

(52) U.S. Cl.
CPC ............ *E21B 47/017* (2020.05); *E21B 47/01* (2013.01); *E21B 47/13* (2020.05)

(58) Field of Classification Search
CPC ......... E21B 47/017; E21B 47/13; E21B 47/01
See application file for complete search history.

(56) References Cited

U.S. PATENT DOCUMENTS

| 4,788,544 | A | 11/1988 | Howard | |
|---|---|---|---|---|
| 9,080,398 | B2* | 7/2015 | Bouligny | E21B 19/155 |
| 2008/0238095 | A1* | 10/2008 | Yater | E21B 21/02 |
| | | | | 285/333 |
| 2012/0080227 | A1* | 4/2012 | Cardellini | E21B 44/00 |
| | | | | 175/40 |
| 2013/0168106 | A1* | 7/2013 | Leman | E21B 19/07 |
| | | | | 166/380 |
| 2015/0021016 | A1* | 1/2015 | Deng | E21B 19/166 |
| | | | | 166/250.01 |
| 2015/0176390 | A1* | 6/2015 | Greening | E21B 3/02 |
| | | | | 73/152.49 |
| 2015/0285055 | A1* | 10/2015 | Anderson | E21B 3/02 |
| | | | | 175/40 |
| 2019/0100987 | A1* | 4/2019 | Pfrenger | E21B 44/00 |
| 2019/0316463 | A1* | 10/2019 | Pfrenger | G06K 19/0723 |
| 2019/0355945 | A1* | 11/2019 | Alkier | H01M 4/625 |

OTHER PUBLICATIONS

Nabors, Achieve Quality Monitoring, Control, And Evaluation Of Tubular Connections With Nabors' Testork TM Sub And Software, Rigtelligence SM for the Future, www.nabors.com.
Aelium Solutions LLC, WITS A Smart Solution, Wireless Information Technology System TM, www.aeliumsolutions.com.

* cited by examiner

*Primary Examiner* — Robert E Fuller
(74) *Attorney, Agent, or Firm* — Field LLP

(57) ABSTRACT

A sensor-on-clamp device for use in a drilling system, the clamp being a tool joint clamp and houses one or more sensors mounted to the tool joint clamp, a power source and sensor data transmitting means. One or more sensors for use in a drilling system, said sensors being powerable by a single commercially available, replaceable battery.

12 Claims, 8 Drawing Sheets

SENSOR ON CLAMP DEVICE

FIELD OF INVENTION

The present disclosure relates to improvements in sensors used in conjunction with oil and gas well drilling operations.

BACKGROUND OF THE INVENTION

Oil and gas wells are first drilled using sections of drill pipe progressively threaded together forming a drill string with a drilling bit always at the bottom. During drilling, the top drive provides rotational torque to the drilling bit by way of the drill string. After the initial well is drilled, the drill string is removed and tubing or casing strings, are similarly threaded together and lowered down the wellbore for the purposes of performing operations or producing oil or gas from the well.

During the drilling phase, there is required a means to monitor the forces being applied to the drill string and the drilling bit to ensure that the well is being drilled as efficiently as possible. Forces are generated by the interaction of the pipe string and drilling bit with the surrounding formations can be measured using acceleration sensors. The sensor data can be electronically recorded for future analysis as well as presented graphically to the drilling crew for real-time adjustments.

These sensors are typically installed below the top drive and as a result, must fit in a very limited space that is also occupied by the manual and remote well control valves as well as the pipe handler.

The most commonly faced problem with previous sensor deployments is fitting it up to the existing top-drive. The most widely used top drive in the industry has a fixed distance from the drive shaft (referred to as the quill) to the pipe handler. The only way to previously fit a sensor in this distance is to increase the length of the torque arrestor that holds the pipe handler as can be seen in FIG. 1. This increased length of the torque arrestor provides the additional space required to install the sensor. Increasing the torque arrestor length is costly, and further makes the arrestor difficult to install, as well as the fact that such extended torque arresters are not available for all top drive models.

A need therefore exists for providing sensors that are dimensioned such that it can be located within the existing configuration of the top drive such that further lengthening of the torque arrester is not required.

Sensors for measuring parameters such as torque, turns, vibration, revolutions per minute, flow rates, pressure and temperature are also often required in many other applications such as in completion of wellbores, pipeline related work and mining. In all cases locating sensors so as not to take up too much space, not to impede operation and still collect relevant sensor data is of high importance.

SUMMARY

A sensor-on-clamp device is provided for use in a drilling system, wherein said clamp is a tool joint clamp of the drilling system and wherein said device houses one or more sensors, a power source and sensor data transmitting means.

A sensor-on-clamp device is further provided for use in a drilling system, said device being powerable by one or more commercially available replaceable batteries.

A battery holder is also provided comprising a battery housing for housing batteries in a hazardous environment, wherein said batteries are replaceable within the battery holder the battery holder stays in the hazardous environment.

A method is further provided for replacing a battery in a hazardous environment. The method comprises the steps of providing a battery holder comprising battery housing having an electrical contact area, a removable end cap, and spring formed in the battery housing; placing a battery in the housing, wherein said spring is extended to prevent contact of the battery with the electrical contact area in the battery housing; engaging the end cap to the housing at least a minimum distance to seal off a flame path and isolate the battery from the hazardous environment; and engaging the end cap to the housing fully to cause compression of the spring to allow electrical connection of the battery to the electrical contact area only after the flame path is sealed off.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE DRAWINGS

A further, detailed, description of the invention, briefly described above, will follow by reference to the following drawings of specific embodiments of the invention. The drawings depict only typical embodiments of the invention and are therefore not to be considered limiting of its scope. In the drawings.

Figure 1:
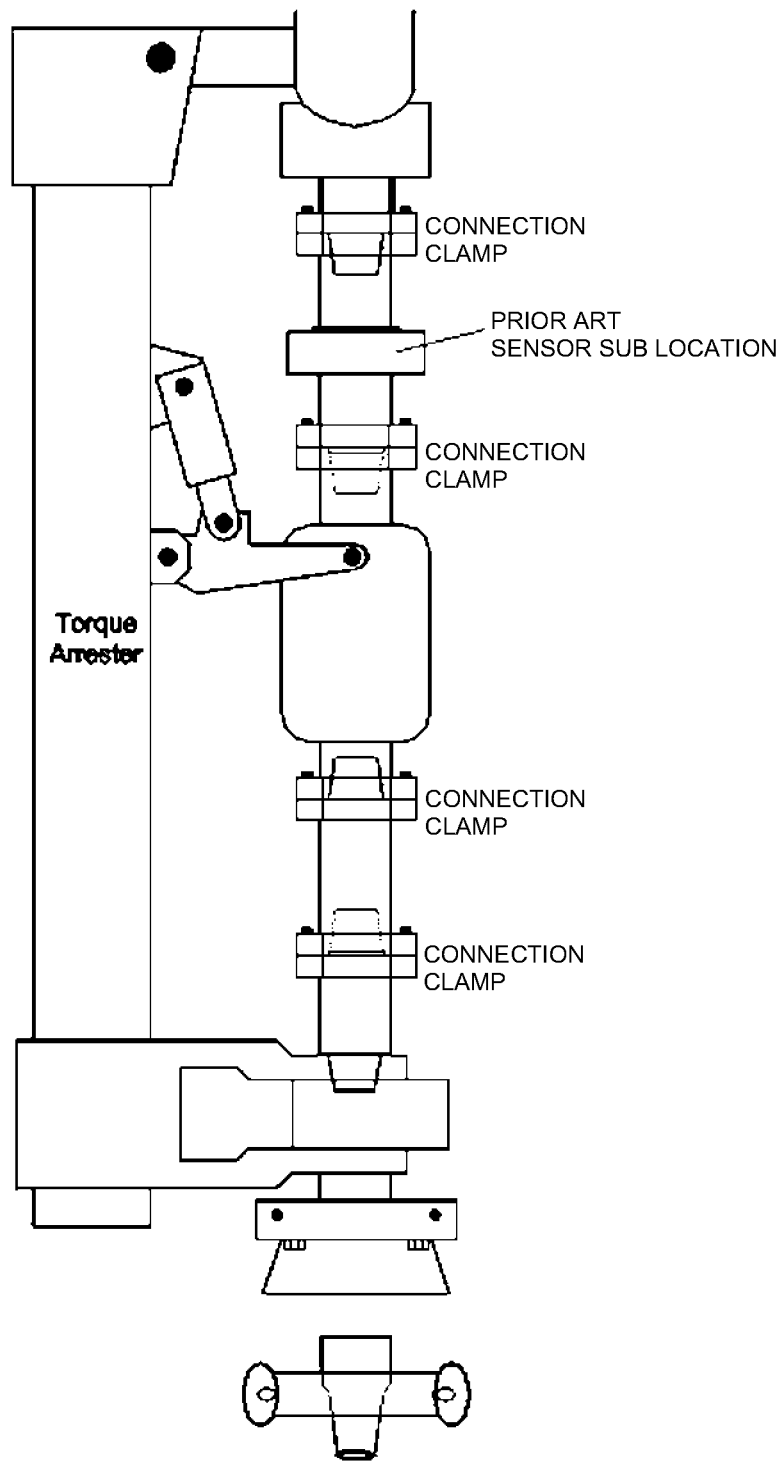
FIG. 1 is an elevation view of a typical top drive for a drilling system.

The drawing is not necessarily to scale and in some instances proportions may have been exaggerated in order more clearly to depict certain features.

DETAILED DESCRIPTION OF VARIOUS EMBODIMENTS

The description that follows and the embodiments described therein are provided by way of illustration of an example, or examples, of particular embodiments of the principles of various aspects of the present invention. These examples are provided for the purposes of explanation, and not of limitation, of those principles and of the invention in its various aspects.

With reference to the Figures, in one embodiment, the present disclosure provides a sensor-on-clamp device 100. The present invention in some embodiments relates to a tool joint clamp 6 that can be mounted with sensors 8 and other related equipment such as power sources and transceivers, the tool joint clamp 6 being one that is already used in the system. While connection clamps 6 and tool joint clamps are examples of such clamps, it would be well understood that other clamps used in, for example, pipelines or mining, would also work for housing the sensor-on-clamp device 100. In some embodiments, the sensor-on clamp device 100 is housed on a housing 2 mounted to the tool joint clamp 6. In other embodiments of the invention, a custom tool joint clamp 6 may be manufactured in which sensors 8 are directly housed or mounted.

Figure 2:
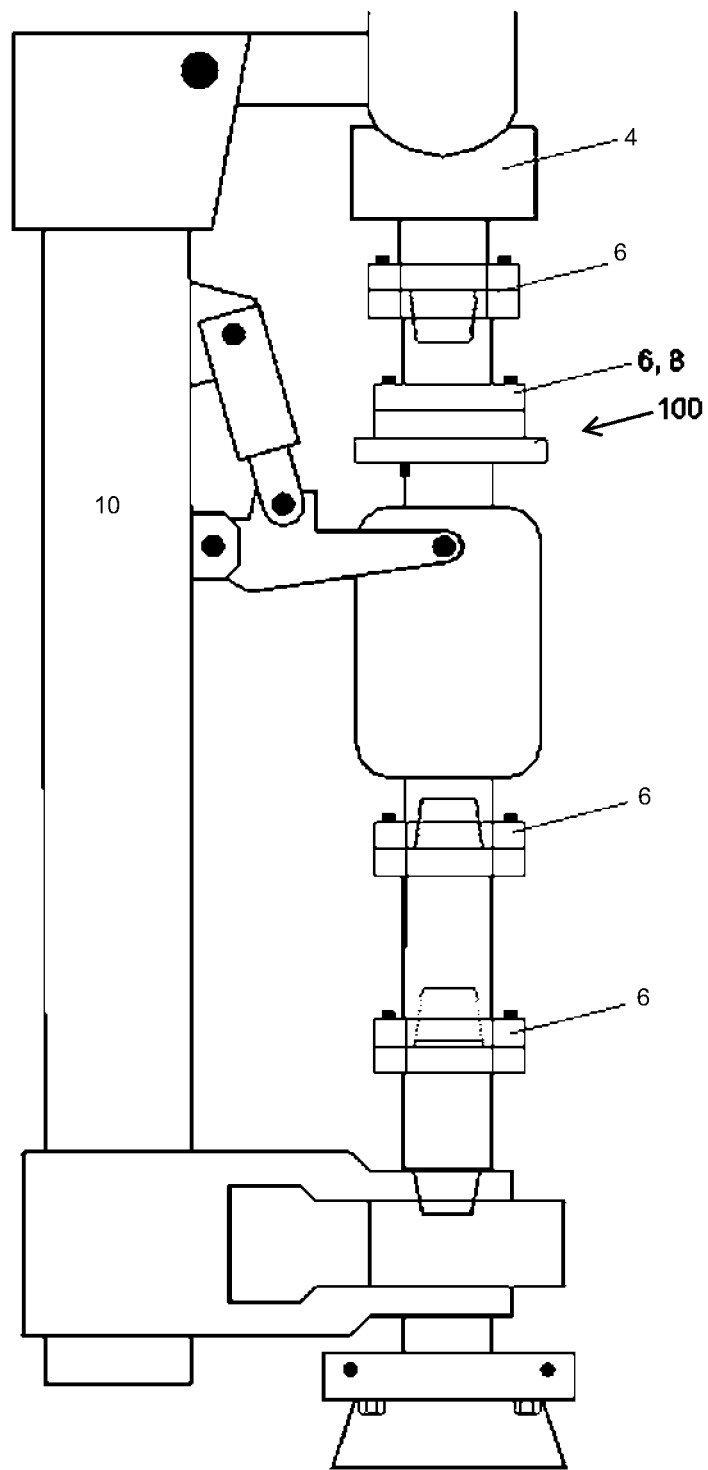
FIG. 2 is an elevation view of a top drive for a drilling system showing one example of the sensors of the present invention located on the tool joint clamp.

In a preferred embodiment, the sensors 8 of the present invention are located on the tool joint clamp 6 of the drill string, as seen in FIG. 2. In this embodiment, the sensors 8 can be located below the top-drive system 4. Connection clamps 6 are routinely used in the oil and gas drilling industry to secure rotary shouldered connections during drilling. Connection clamps, which can also be called tool joint clamps, are commonly placed over the top of rotary shouldered connections to prevent loosening due to drilling vibration.

The sensors 8 measure the dynamic X, Y and Z axis accelerations of the drill string or the tubular connection to be made up. Real-time acceleration data is useful input to dynamic prediction models to prevent equipment damage and down-time.

It would be well understood that other sensors 8 for measuring parameters such as, for example, torque, turns, vibration, revolutions per minute, flow rates, pressure and temperature can also be part of the sensor-on-clamp device 100.

The sensors 8 can be installed on existing top drives 4 without the need to extend the torque arrestor 10 as with previous sensor deployments. This allows the sensors 8 to be quickly deployed on almost any top drive arrangement.

Figure 3:
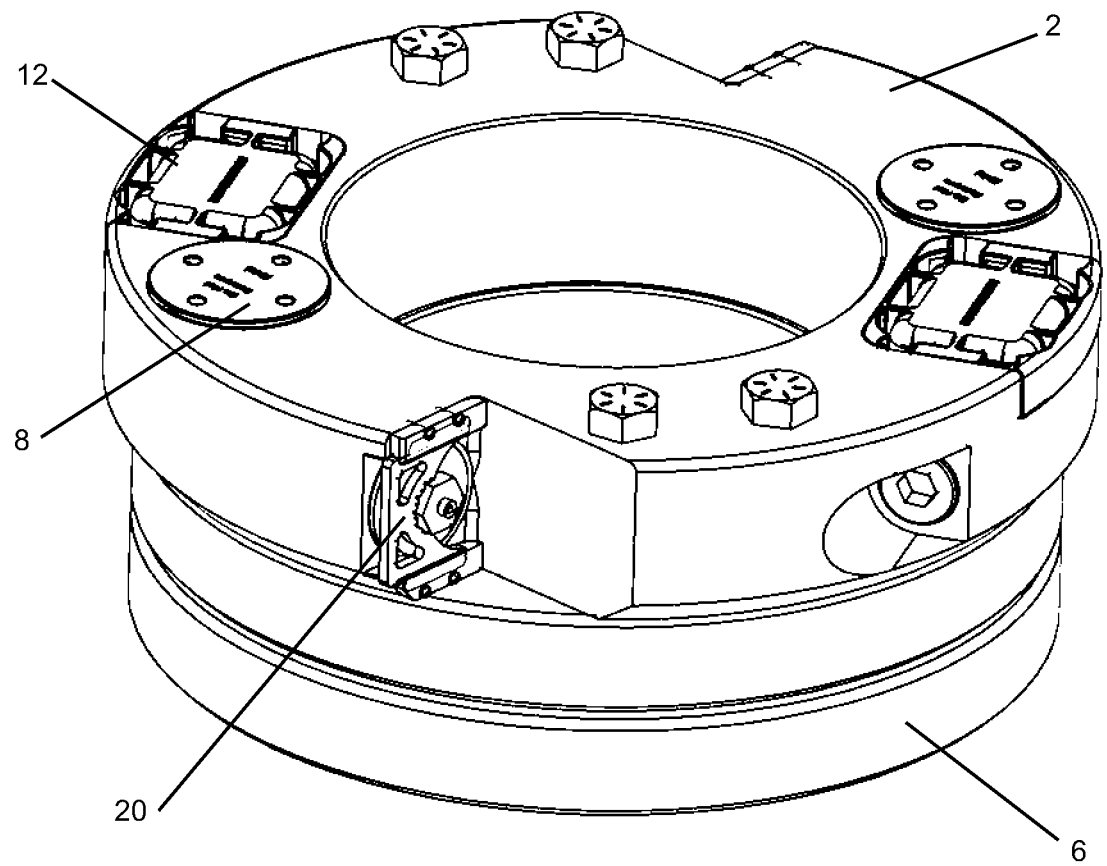
FIG. 3 is a perspective view of one example of the sensors of the present invention, mounted to the tool joint clamp.

More details of one example of the sensors 8 can be seen in FIG. 3. The X, Y, and Z acceleration sensors 8 are self-contained in a housing 2 along with a battery or power source and a transceiver 12. Other sensors 8 measuring other parameters may also be mounted on the housing 2. While FIG. 3 illustrates the housing 2 as being mounted to a top side of the tool joint clamp 6, it would be understood that the housing 2 could be mounted to a bottom end as well, or the housing 2 can be configured to fit around an outer diameter of the tool joint clamp 6. All of these configurations are possible without departing from the scope of the invention. In a further embodiment, rather than using a commercially available tool joint clamp 6, it is possible to modify a tool joint clamp 6 to custom make a tool joint clamp 6 that can hold the sensors 8, transceiver 12 and battery or power source directly on or in the tool joint clamp 6, with no need for a separate housing for the sensor system 2.

The housing 2 can be bolted onto a commercially procured tool joint clamp 6 of the appropriate size for the application. Alternatively, the housing 2 can be mounted or affixed in any number of ways including but not limited to directly welding to the tool joint clamp 6, being strapped to the tool joint clamp 6, soldered to the tool joint clamp 6, or affixed by an appropriate adhesive. One or more optional redundant channels can be added for data reliability during critical drilling phases.

Figure 4:
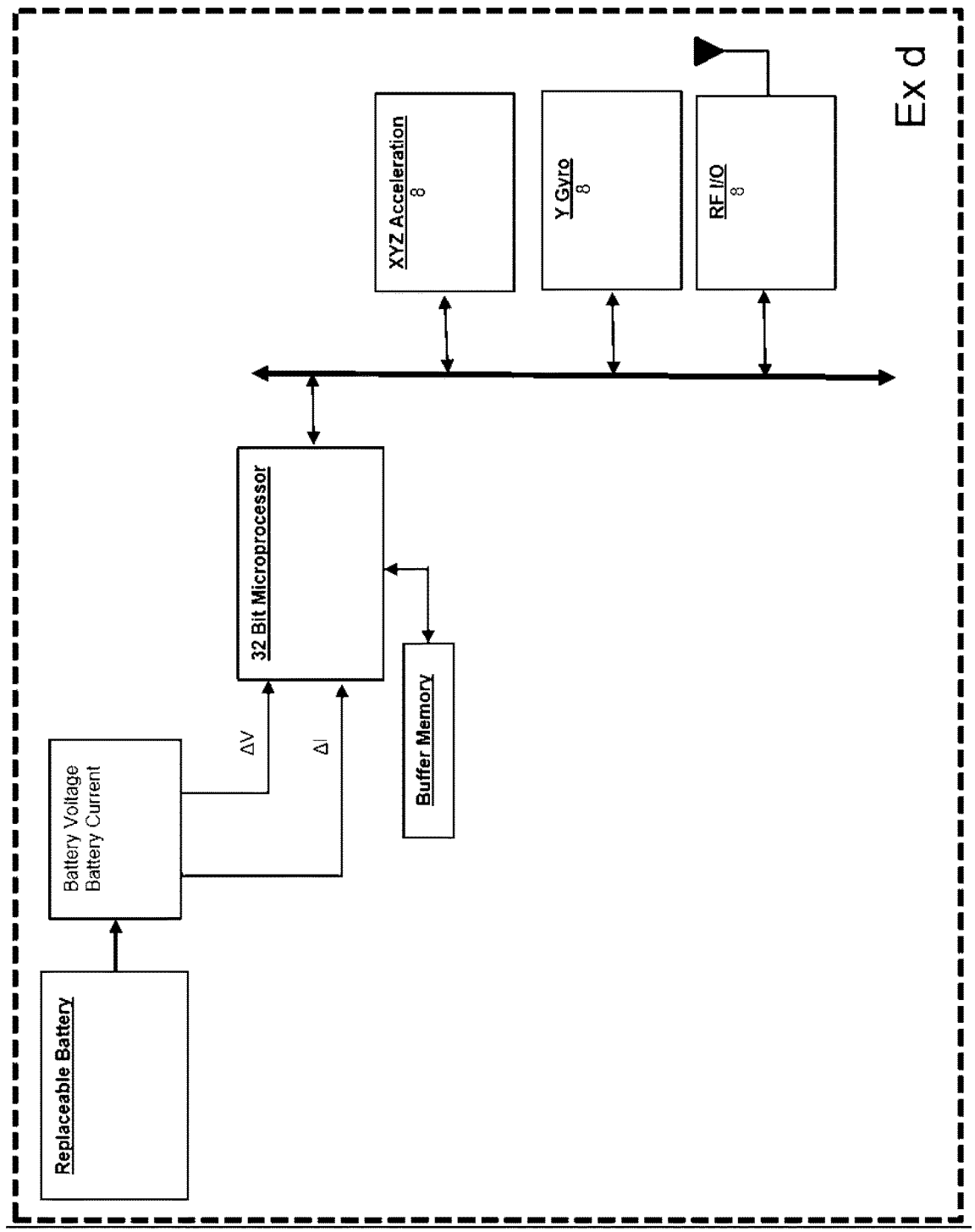
FIG. 4 is a schematic diagram of communications between one or more sensors of the present invention and a receiver for receiving sensor data.
Figure 7:
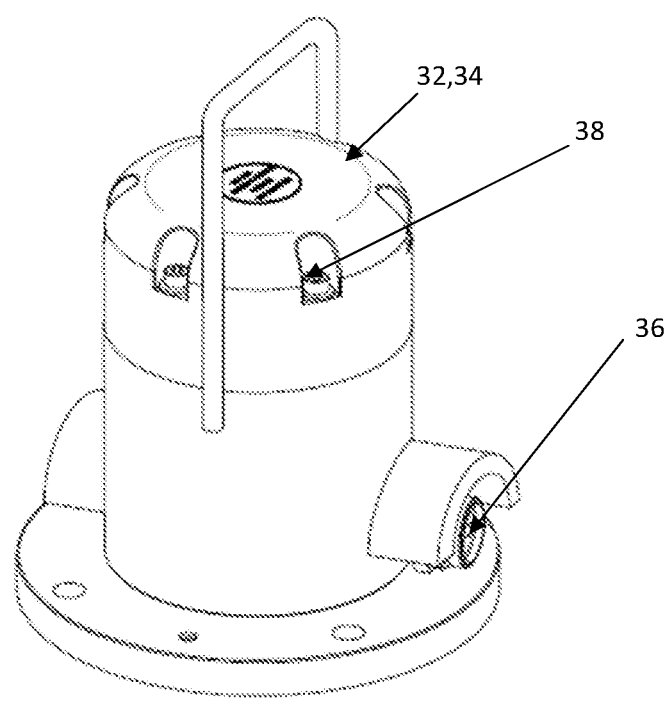
FIG. 7 is a perspective view of a remote antenna for use with the receiver hub of FIG. 6.

The present disclosure also provides for improved sensors 8 having a modified electrical sensor design, as seen in FIG. 4. Sensors 8 are used to measure data including dynamic acceleration in all three axis (X, Y, Z) and revolutions per minute (RPM). The sensors 8 transmit the measurements to a remote receiver to process said data, and then transmit it in real-time for viewing by the operators In the present invention, data processing functions can optionally be removed from the sensors 8 and can instead be conducted by a remote receiver 32 at a receiver hub 34, as seen in FIG. 7, which has increased processing capabilities over the sensors 8. In this embodiment, the sensors 8 would only digitize the analog signals from the raw data values collected and transmit those digitized signals with no further processing.

Alternatively, some data processing can be conducted at the sensors 8 and then transmitted externally for further processing. Most preferably data is transmitted to the receiver 32 using wireless transmission, although any other means of transmission including radio frequency (RF), near-field communication, Bluetooth, wireless internet, optical or sonic could be used.

The present sensors 8 would still have the ability to simultaneously measure 3-axis acceleration in real-time. Optionally, one or more spare channels can be made available in the sensors 8 for adding future measurement parameters.

With reference to FIG. 4, a combination of protection methods is preferably incorporated to meet explosion and electrical requirements at the well drilling site. For example, elements such as the battery and sensors 8 are preferably contained in an explosion proof (Ex d) protection for the higher power components. Ex d is used for high power devices that exceed the energy storage limitations imposed by intrinsically safe (Ex ia) protection. This provides a more cost effective way to comply with hazardous area standards worldwide.

One benefit of the remote processing of either raw or partially processed data from the sensors 8 is that allows the use of a smaller, and often lower cost, battery to power the sensors 8 than used previously. The present sensors 8 hence do not require a complicated and custom battery pack. Instead, the present sensors 8 can use a commercially available primary battery that can be locally sourced. This in turn alleviates issues associated with producing and shipping custom lithium battery packs. Lithium battery packs are heavily regulated by local and international agencies for transport and shipping, especially by air, due to the volatile nature of lithium.

The present invention provides a new electronic circuit design to allow the present sensors 8 to operate for as long as 30 days on a single commercially available, replaceable battery. Preferably this is a lithium battery, further preferably D' size. Optionally the present sensor sub 2 can be powered by one, two, three or more battery cells. The sensor sub 2 can more preferably operate for 30 days on 1 battery, for 60 days on 2 batteries, or for up to 90 days on 3 batteries.

Hazardous area standards refer to this kind of lithium battery as Type E. However, it would be understood that any compatible battery could potentially be used, including rechargeable batteries. New developments in low cost, low power sensors 8 and electronics enable the power consumption of the sensors 8 to be dramatically reduced. To utilize a user installable commercial battery, a novel battery holder 20 has been developed that can maintain electrical contact despite shock loads, vibrations, and varying temperature ranges experienced in the drilling equipment. Commonly, such equipment can experience up to 300 g shock loads, up to 30 g random vibrations, and temperature ranges from −40C up to 85C.

Figure 5C:
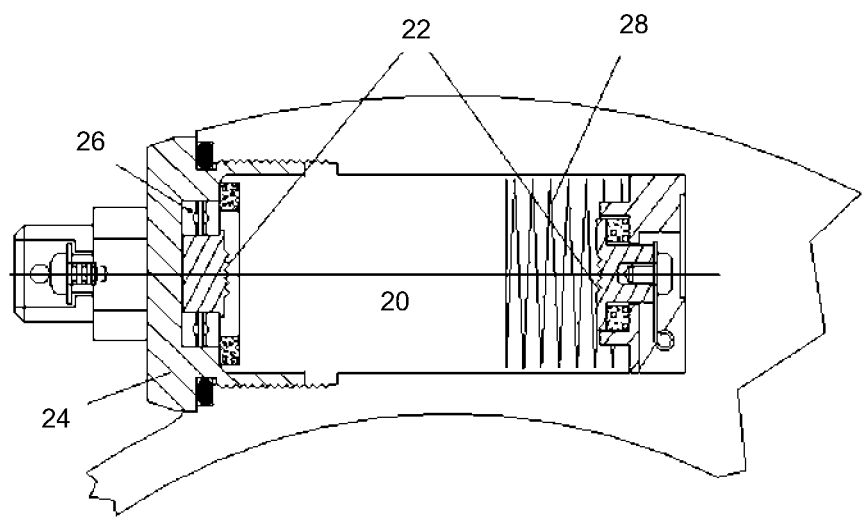
FIG. 5c is a cross sectional elevation view of the battery holder of FIGS. 5a and 5b.
Figure 5A:
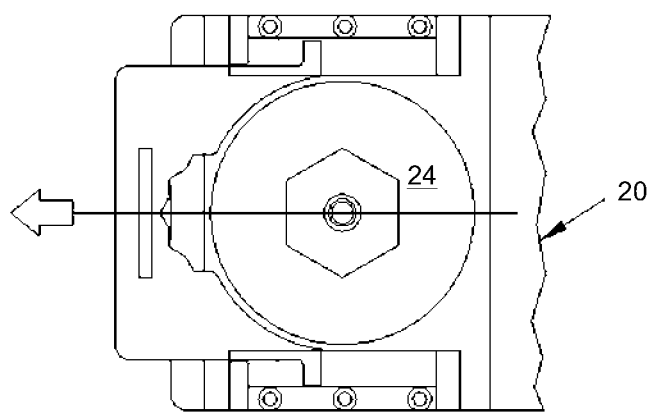
FIGS. 5a and 5b are end views of a battery holder of the sensors of the present invention in an open and a closed position respectively.
Figure 5B:
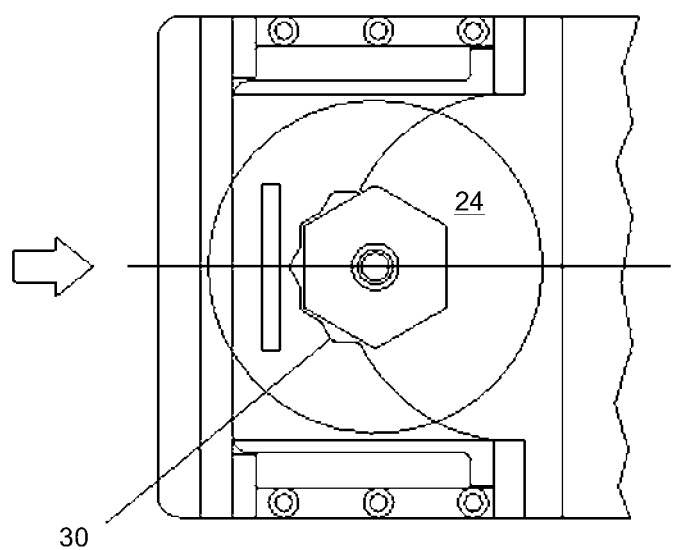

The current battery holder 20 design is illustrated in FIGS. 5a, 5b and 5c. While this battery holder 20 can be used in connection with a sensor housing or tool joint clamp 6 such as those described earlier, it is also possible for the battery holder 20 to be used for any battery operated tool, equipment or component that is used in a hazardous environment or environment that otherwise requires explosion proof rating.

The present battery holder 20 includes a serrated contact area 22 to grip the battery electrical terminal. The purpose of the serration is to prevent loss of electrical contact due to shock and vibration. Serrated contacts 22 are formed on a removable end cap 24 and will preferably have a bearing 26 to allow the end cap 24 to be threaded into the battery housing without rotating the serrated contact 22 against the battery terminal. Further serrated contacts 22 can be formed on the inner wall of the battery housing A spring 28 is further preferably provided to urge the battery partially out of the battery housing when the end cap 24 is opened, so that the battery can be easily removed. An additional function of the spring 28 may be to prevent electrical connection of the battery until a predetermined number of threads, and preferably at least five threads, of the battery end cap 24 have been engaged. This function may serve to satisfy requirements for "hot swap" of batteries in the presence of an explosive atmosphere since the electrical contact is not made until the end cap 24 is nearly secured, to thereby isolate the electrical connection of the battery from the atmosphere. The present design provides the ability to replace the battery in a hazardous environment, since as the end cap 24 is secured; it serves to seal off a flame path, thereby isolating the battery from the hazardous environment, before electrical contact of the battery to battery holder 20 contacts is made. As seen in FIGS. 5A and 5B, a locking mechanism 30 preferably engages the battery cap to prevent it from loosening during drilling.

Figure 6:
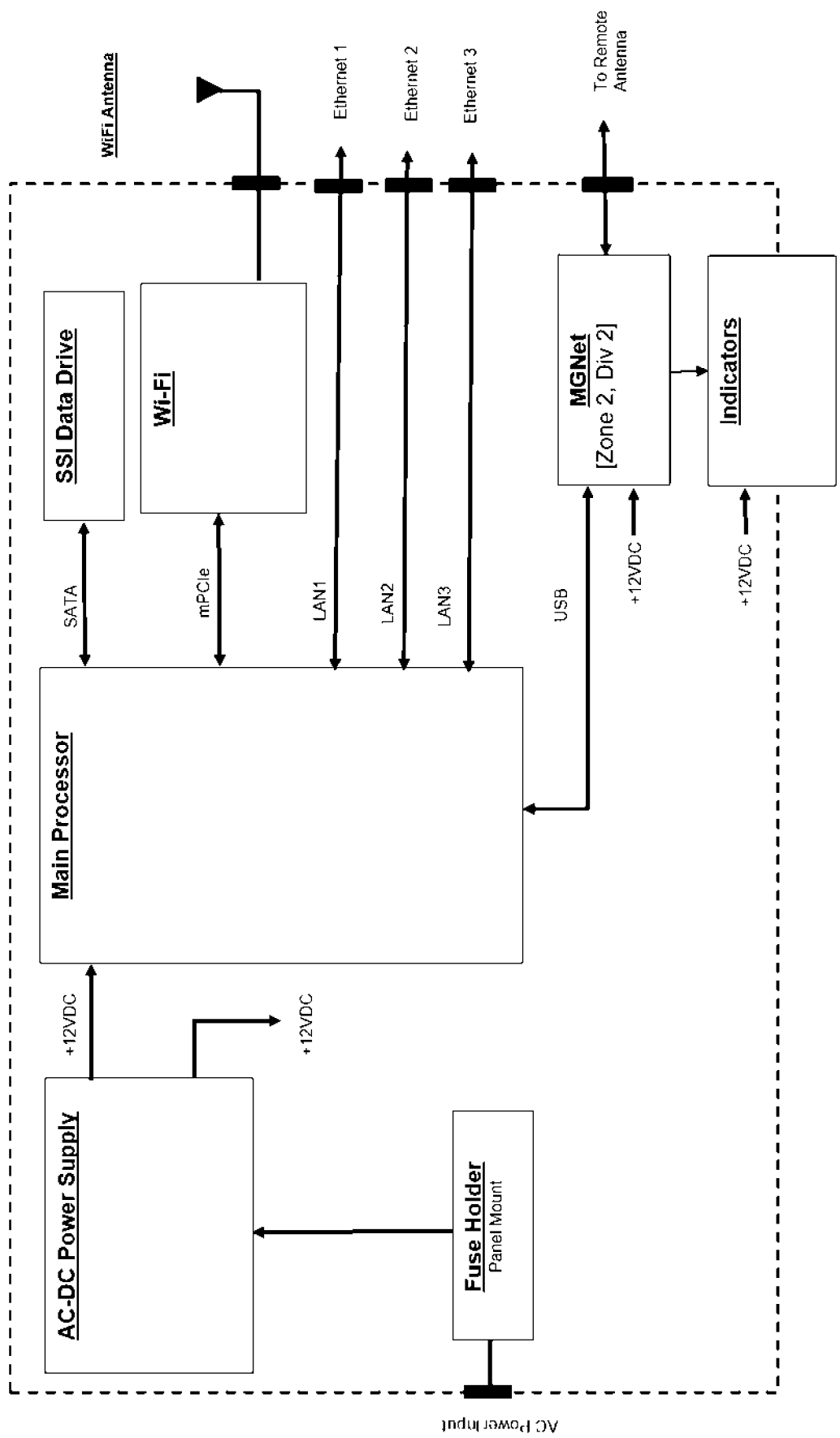
FIG. 6 is a schematic diagram of one example of a receiver hub of the present invention.

With reference to FIG. 6, the receiver 32 in the receiver hub 34 is used to digitally process all raw data measurements obtained from the sensors 8 to provide values in useful engineering units to external systems. The receiver 32 operates from AC mains power and provides storage and an input/output interface for the processed measurements. Typically, the receiver 32 is located in the central indoor control room of the drilling rig. If the transmissions from the sensors 8 cannot penetrate the metal walls of the control room, the use of external antennas that are located outside (usually on the roof) of the control room may be employed.

In the present receiver hub 34 design, one or more remote antennas 38 are connected to the receiver hub 34 via a, for example, Controller Area Network (CAN) 36, as seen in FIG. 7. The remote antennas 38 receive radio frequency transmissions from the sensors 8 and can be remotely located externally for optimum radio frequency reception. The radio frequency sensor signals are received and then sent to the receiver 32 using the CAN connection 36 or other suitable connection network.

The main input/output data connection for the receiver hub 34 is preferably an ethernet connection, as illustrated in FIG. 6. The ethernet connection allows multiple receiver hubs 34 to be interconnected to form a local network. By setting one receiver hub 34 as a server and further receiver hubs as clients, any number of receiver hubs can be connected to accommodate any number of sensor inputs. Ethernet also preferably connects directly to displays and laptop computers for logging drilling operations. The receiver hub 34 can also include a wireless internet connection for additional data networking capability when ethernet cabling is not practical.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

The invention claimed is:

1. A sensor-on-clamp device for use in a drilling system, said device comprising:
a tool joint clamp configured to be placed over the top of a rotary shouldered connection of a drill string, said tool joint clamp configured to secure the rotary shouldered connection against loosening while a drive provides rotational torque to a drill bit by way of said drill string; and one or more sensors, a power source and sensor data transmitting means mounted to the tool joint clamp.

2. The device of claim 1, wherein the one or more sensors comprise sensors that measure parameters selected from the group consisting of X, Y and Z axis dynamic acceleration, torque, turns, revolutions per minute, flow rates, pressure, temperature and combinations thereof.

3. The device of claim 2, wherein the one or more sensors are mounted to a housing that is in turn mounted to the tool joint clamp.

4. The device of claim 1, wherein the transmitting means are selected from the group consisting of from radio frequency (RF), near-field communication, Bluetooth™, wireless internet, optical, sonic and combinations thereof.

5. The device of claim 1, wherein said one or more sensors collect data relating to operation of the drilling system, digitize said data and transmit the data to a remote receiver hub.

6. The device of claim 5, wherein the digitized data is received by the receiver hub via a remote antenna.

7. The device of claim 1, for use in a drilling system, wherein said power source comprises one or more commercially available replaceable batteries.

8. The device of claim 7, comprising a battery holder for housing batteries in a hazardous environment, wherein said batteries are replaceable within the battery holder while the battery holder stays in the hazardous environment.

9. The device of claim 8, wherein the battery holder comprises a removable end cap, and a spring formed in the battery housing to urge the battery partially out of the battery housing when the end cap is opened, said spring and end cap serving to prevent electrical connection of the battery to battery holder until a predetermined number of threads of the removable end cap have been engaged, thus sealing off a flame path and isolating the battery from the hazardous environment before electrical contact is made.

10. The device of claim 9, wherein the battery holder comprises one or more serrated contacts formed on the removable end cap to grip the battery electrical terminal.

11. The device of claim 10, wherein the end cap comprises a bearing to allow the cap to be screwed into the battery holder without rotating the serrated contact against the battery terminal.

12. A method of replacing a battery in the sensor-on-clamp device according to claim 1, said method comprising the steps of:
   a. providing a battery holder in said sensor-on-clamp device, said battery holder comprising battery housing having an electrical contact area, a removable end cap, and spring formed in the battery housing;
   b. placing a battery in the housing, wherein said spring is extended to prevent contact of the battery with the electrical contact area in the battery housing;
   c. engaging the end cap to the housing at least a minimum distance to seal off a flame path; and
   d. engaging the end cap to the housing fully to cause compression of the spring to allow electrical connection of the battery to the electrical contact area only after the flame path is sealed off.

* * * * *